United States Patent
Urakata et al.

(10) Patent No.: US 10,717,594 B2
(45) Date of Patent: Jul. 21, 2020

(54) PRESSURIZING SYSTEM FOR POWDER SUPPLY HOPPER, GASIFICATION FACILITY, INTEGRATED GASIFICATION COMBINED CYCLE FACILITY, AND METHOD FOR PRESSURIZING POWDER SUPPLY HOPPER

(71) Applicant: MITSUBISHI HITACHI POWER SYSTEMS, LTD., Yokohama, Kanagawa (JP)

(72) Inventors: Yuichiro Urakata, Yokohama (JP); Koji Nishimura, Yokohama (JP); Naoto Nakayama, Yokohama (JP); Yoshinori Koyama, Tokyo (JP); Tatsuya Kameyama, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 171 days.

(21) Appl. No.: 16/072,286

(22) PCT Filed: Feb. 6, 2017

(86) PCT No.: PCT/JP2017/004211
§ 371 (c)(1),
(2) Date: Jul. 24, 2018

(87) PCT Pub. No.: WO2017/138488
PCT Pub. Date: Aug. 17, 2017

(65) Prior Publication Data
US 2019/0031430 A1    Jan. 31, 2019

(30) Foreign Application Priority Data

Feb. 8, 2016   (JP) ................... 2016-022093

(51) Int. Cl.
*B65D 88/28* (2006.01)
*B65G 53/66* (2006.01)
(Continued)

(52) U.S. Cl.
CPC ............. *B65D 88/28* (2013.01); *B65G 53/22* (2013.01); *B65G 53/66* (2013.01); *C10J 3/466* (2013.01);
(Continued)

(58) Field of Classification Search
CPC ........ B65G 53/04; B65G 53/40; B65G 53/36; B65G 53/66
See application file for complete search history.

(56) References Cited

U.S. PATENT DOCUMENTS

RE31,572 E * 5/1984 Coulter ................... C21B 5/003
                                                        222/1
5,516,356 A * 5/1996 Schmit .................... B01F 3/188
                                                        266/83
(Continued)

FOREIGN PATENT DOCUMENTS

JP    57-184027 A   11/1982
JP    4-286536 A    10/1992
(Continued)

OTHER PUBLICATIONS

International Search Report dated May 16, 2017, issued in counterpart to International Application No. PCT/JP2017/004211, with English translation. (5 pages).
(Continued)

*Primary Examiner* — Matthew J Merkling
(74) *Attorney, Agent, or Firm* — Westerman, Hattori, Daniels & Adrian, LLP

(57) ABSTRACT

Provided is a pressurizing system which includes: a pressurizing nozzle configured to supply a pressurizing gas into
(Continued)

a hopper (3) where pulverized coal is accumulated; a filter configured to face a space in the hopper (3) where the pulverized coal is accumulated, and to allow the pressurizing gas to pass through the filter, the filter being provided at an end of the pressurizing nozzle; buffer tanks (5a), (5b) in which a pressurizing gas to be supplied to the hopper (3) is collected at a first predetermined pressure; and a pressure control means configured to start, at a time of starting pressurization of the hopper (3), supply of a pressurizing gas at a second predetermined pressure which is lower than the first predetermined pressure of the pressurizing gas collected in the buffer tanks (5a), (5b).

10 Claims, 9 Drawing Sheets

(51) Int. Cl.
    *C10J 3/50*       (2006.01)
    *F23K 3/02*       (2006.01)
    *B65G 53/22*      (2006.01)
    *C10J 3/46*       (2006.01)
    *B65G 53/36*      (2006.01)

(52) U.S. Cl.
CPC ............... *C10J 3/50* (2013.01); *C10J 3/506* (2013.01); *F23K 3/02* (2013.01); *B65G 53/36* (2013.01); *B65G 2201/045* (2013.01); *C10J 2200/152* (2013.01); *C10J 2300/093* (2013.01); *C10J 2300/1823* (2013.01); *Y02E 20/16* (2013.01); *Y02E 20/18* (2013.01)

(56) References Cited

U.S. PATENT DOCUMENTS

| | | | |
|---|---|---|---|
| 8,337,122 | B2 * | 12/2012 | Schultz ............. B65G 53/66 406/137 |
| 8,915,980 | B2 | 12/2014 | Hanrott |
| 2011/0110729 | A1 | 5/2011 | Schultz |
| 2013/0298465 | A1 | 11/2013 | Kizu et al. |
| 2017/0283720 | A1 * | 10/2017 | Schmit ............. B65G 53/12 |
| 2018/0251322 | A1 * | 9/2018 | Schmit ............. B65G 53/66 |

FOREIGN PATENT DOCUMENTS

| | | |
|---|---|---|
| JP | 6-115590 A | 4/1994 |
| JP | 2000-119666 A | 4/2000 |
| JP | 2013-139310 A | 7/2013 |
| WO | 2012/115054 A1 | 8/2012 |

OTHER PUBLICATIONS

Written Opinion dated May 16, 2017, issued in the International Application No. PCT/JP2017/004211, with English translation. (14 pages).

Office Action dated Mar. 24, 2020, issued in counterpart JP Application No. 2016-022093, with English translartion (8 pages).

\* cited by examiner

PRESSURIZING SYSTEM FOR POWDER SUPPLY HOPPER, GASIFICATION FACILITY, INTEGRATED GASIFICATION COMBINED CYCLE FACILITY, AND METHOD FOR PRESSURIZING POWDER SUPPLY HOPPER

TECHNICAL FIELD

The present invention relates to a pressurizing system for a powder supply hopper which supplies, for example, powder forming a carbon-containing solid fuel to a gasification furnace, a gasification facility, an integrated gasification combined cycle facility, and a method for pressurizing a powder supply hopper.

BACKGROUND ART

For example, for a gasification facility, a carbonaceous fuel gasification apparatus (coal gasification apparatus) is known where a carbon-containing solid fuel such as coal is supplied into a gasification furnace, and the carbon-containing solid fuel is partially combusted so as to gasify the carbon-containing solid fuel, thus producing a combustible gas.

In an integrated coal gasification combined cycle (hereinafter referred to as "IGCC") facility, a produced gas produced by a gasification apparatus using a carbon-containing solid fuel such as coal is purified by a gas purifying device, thus forming a fuel gas and, thereafter, the fuel gas is supplied to a gas turbine facility so as to generate power. The gasification facility is provided with finely powdered fuel supply hoppers (powder supply hoppers) for supplying a finely powdered fuel (powder) such as pulverized coal to the gasification furnace. In the case where coal is used as a carbon-containing solid fuel, the finely powdered fuel supply hopper functions as a pulverized coal supply hopper, and is supplied with pulverized coal under atmospheric pressure from a mill, which pulverizes coal into a powdered state, via a pulverized coal bin. When a predetermined amount of pulverized coal is accumulated in the pulverized coal supply hopper, the pulverized coal supply hopper is hermetically sealed and, thereafter, is pressurized to a predetermined pressure by a pressurizing gas such as nitrogen gas. The reason for pressurizing the pulverized coal supply hopper is as follows. That is, the gasification furnace to which pulverized coal is to be supplied is in a pressurized state, so that the pulverized coal supply hopper is pressurized so as to maintain the pressure in the pulverized coal supply hopper equal to or greater than the pressure in the gasification furnace. The pulverized coal supply hopper which is pressurized to a predetermined pressure supplies pulverized coal into the gasification furnace due to a pressure difference between the pulverized coal supply hopper and the gasification furnace. When supply of pulverized coal is finished, a connection between the pulverized coal supply hopper and the gasification furnace is cut. Thereafter, a pressure in the pulverized coal supply hopper is returned to the atmospheric pressure, and the pulverized coal supply hopper receives pulverized coal from the pulverized coal bin again. A plurality of pulverized coal supply hoppers, which repeatedly perform such pressurization and depressurization, are provided. By switching between the pulverized coal supply hoppers, pulverized coal is continuously supplied to the gasification furnace (see PTL 1).

In such a pressurizing system for pressurizing the pulverized coal supply hoppers, buffer tanks are installed so as to shorten a pressurization time for the pulverized coal supply hoppers and to reduce a capacity of a pressurizing nitrogen compressor, and the pulverized coal supply hoppers are pressurized using nitrogen of high pressure which is collected in the buffer tanks.

FIG. 9 shows a pressurizing system for a pulverized coal supply hopper shown in FIG. 2 of PTL 2. Two pulverized coal supply hoppers 103, which supply pulverized coal to a gasification furnace 100, are provided in parallel. Each of the respective pulverized coal supply hoppers 103 is supplied with nitrogen gas through valves 106, 107 from buffer tanks 104, 105 in which the nitrogen gas is collected. Further, a pressurizing gas (nitrogen gas) is emitted to the atmosphere from each of the respective pulverized coal supply hoppers 103 through valves 108.

CITATION LIST

Patent Literature

[PTL 1] Japanese Unexamined Patent Application, Publication No. 2000-119666
[PTL 2] PCT International Publication No. WO 2012/115054

SUMMARY OF INVENTION

Technical Problem

The pulverized coal supply hoppers disclosed in PTL 2 is provided with pressurizing nozzles for jetting nitrogen gas supplied from the buffer tank into the pulverized coal supply hopper. A filter is installed at an end of each pressurizing nozzle so as to prevent a backflow of pulverized coal to a nitrogen system.

In starting pressurization of the pulverized coal supply hopper, the inside of the pulverized coal supply hopper assumes the atmospheric pressure as described above. Accordingly, in the initial stage of the pressurization of the pulverized coal supply hopper, a residual pressure of a pressurizing nitrogen gas in a header or a pressure of nitrogen gas collected in the buffer tank is applied to the filter of each pressurizing nozzle at once, so that the filter is exposed to a large differential pressure between the residual pressure of the pressurizing nitrogen gas or the pressure of the nitrogen gas and the atmospheric pressure. In that case, a flow velocity of nitrogen gas which passes through the filter increases, so that an extremely large stress is generated on the filter, thus having a problem that the filter may be broken in some cases.

The present invention has been made under such circumstance, and it is an object of the present invention to provide a pressurizing system for a powder supply hopper, a gasification facility, an integrated gasification combined cycle facility, and a method for pressurizing a powder supply hopper which can prevent an excessive differential pressure from being applied to the filter of the pressurizing nozzle as much as possible in starting pressurization of the powder supply hopper.

Solution to Problem

To solve the above-mentioned problem, a pressurizing system for a powder supply hopper, a gasification facility, an integrated gasification combined cycle facility, and a method for pressurizing a powder supply hopper according to the present invention adopt the following solutions.

That is, a pressurizing system for a powder supply hopper according to the present invention includes: a pressurizing nozzle configured to supply a pressurizing gas into a powder supply hopper where powder is accumulated; a filter configured to face a space in the powder supply hopper where the powder is accumulated, and to allow the pressurizing gas to pass through the filter, the filter being provided at an end of the pressurizing nozzle; a buffer tank in which a pressurizing gas to be supplied to the powder supply hopper is collected at a first predetermined pressure; and a pressure control means configured to start, at a time of starting pressurization of the powder supply hopper, supply of a pressurizing gas at a second predetermined pressure which is lower than the first predetermined pressure of the pressurizing gas collected in the buffer tank.

In starting pressurization of the powder supply hopper, the pressure control means supplies a pressurizing gas at a pressure lower than a pressure in the buffer tank and hence, a differential pressure to be applied to the filter provided at an end of the pressurizing nozzle, can be reduced.

Accordingly, a flow velocity of a pressurizing gas which passes through the filter can be suppressed, thus reducing a stress to be applied to the filter and hence, breakage of the filter can be prevented.

The pressurizing system of the present invention further includes: a gas supply pipe configured to connect the pressurizing nozzle and the buffer tank to each other; a powder supply hopper inlet valve provided in the gas supply pipe on an upstream side of the pressurizing nozzle; and a buffer tank outlet valve provided in the gas supply pipe on an outlet side of the buffer tank, wherein in a state where the buffer tank outlet valve is closed, the pressure control means opens the powder supply hopper inlet valve so as to start supply of a pressurizing gas, thus boosting a pressure of the pressurizing gas to the second predetermined pressure.

In a state where the buffer tank outlet valve is closed, the powder supply hopper inlet valve is opened so as to start supply of a pressurizing gas. Accordingly, in the initial stage of the pressurization, only a residual pressure in the gas supply pipe is applied to the pressurizing nozzle. Therefore, different from the case where the powder supply hopper inlet valve is opened after the buffer tank outlet valve is opened, there is no possibility of a pressure in the buffer tank being applied to the pressurizing nozzle.

The pressurizing system of the present invention includes: a gas supply pipe configured to connect the pressurizing nozzle and the buffer tank to each other; a powder supply hopper inlet valve provided in the gas supply pipe on an upstream side of the pressurizing nozzle; a buffer tank outlet valve provided in the gas supply pipe on an outlet side of the buffer tank; and a gas ventilation pipe configured to vent a gas in the gas supply pipe, the gas ventilation pipe being connected to the gas supply pipe between the powder supply hopper inlet valve and the buffer tank outlet valve, wherein in a state where the powder supply hopper inlet valve and the buffer tank outlet valve are closed, the pressure control means starts supply of a pressurizing gas after a gas in the gas supply pipe is vented through the gas ventilation pipe, thus boosting a pressure of the pressurizing gas to the second predetermined pressure.

A gas in the gas supply pipe is vented through the gas ventilation pipe and hence, at the time of starting pressurization, there is no possibility of a residual pressure in the gas supply pipe being applied. Accordingly, a flow velocity at the filter in an initial stage can be reduced at the time of starting supply of a pressurizing gas.

The pressurizing system of the present invention further includes: a gas supply pipe configured to connect the pressurizing nozzle and the buffer tank to each other; a powder supply hopper inlet valve provided in the gas supply pipe on an upstream side of the pressurizing nozzle; a buffer tank outlet valve provided in the gas supply pipe on an outlet side of the buffer tank; and a buffer tank outlet valve bypass passage configured to bypass the buffer tank outlet valve, wherein the pressure control means starts supply of a pressurizing gas using the buffer tank outlet valve bypass passage where an amount of pressure reduction of a pressurizing gas is set larger than an amount of pressure reduction of a pressurizing gas which passes through the buffer tank outlet valve.

The buffer tank outlet valve bypass passage has an amount of pressure reduction of a pressurizing gas larger than an amount of pressure reduction of a pressurizing gas which passes through the buffer tank outlet valve, and supply of a pressurizing gas is started using the buffer tank outlet valve bypass passage. Accordingly, a pressurizing gas can be supplied to the pressurizing nozzle at a pressure lower than a pressure at which supply of a pressurizing gas is started from the buffer tank outlet valve.

A means which regulates an amount of pressure reduction may be, for example, a means which regulates a throttle amount using a fixed throttle such as an orifice, or a variable throttle such as a flow rate regulating valve.

The pressurizing system of the present invention further includes: a gas supply pipe configured to connect the pressurizing nozzle and the buffer tank to each other; a powder supply hopper inlet valve provided in the gas supply pipe on an upstream side of the pressurizing nozzle; a buffer tank outlet valve provided in the gas supply pipe on an outlet side of the buffer tank; and a regulating gas supply system configured to supply a pressurizing gas, which regulates a pressure in the powder supply hopper, at a pressure lower than the first predetermined pressure of a pressurizing gas collected in the buffer tank, wherein the pressure control means starts supply of a pressurizing gas using the regulating gas supply system, thus boosting a pressure of the pressurizing gas to the second predetermined pressure.

The regulating gas supply system is provided for regulating a storing state of powder in the powder supply hopper, and a pressurizing gas to be supplied to the regulating gas supply system is supplied at a pressure lower than a pressure of a pressurizing gas collected in the buffer tank. By starting supply of a pressurizing gas using the regulating gas supply system, it is possible to avoid an excessive pressure being applied to the pressurizing nozzle.

The regulating gas supply system for regulating a storing state of powder in the powder supply hopper is also used in pressurizing the powder supply hopper. Accordingly, it is possible to acquire an advantageous effect that it is unnecessary to additionally provide a pipe for pressurization.

The pressurizing system of the present invention further includes a buffer tank bypass passage configured to supply a pressurizing gas to the gas supply pipe while bypassing the buffer tank from a pressurizing gas supply source which supplies a pressurizing gas to the buffer tank, wherein the pressure control means starts supply of a pressurizing gas using the buffer tank bypass passage.

When supply of a pressurizing gas is started by the pressure control means, pressurization of the powder supply hopper is performed in a state where an initial pressure is suppressed and hence, a pressurization time may increase. In view of the above, pressurization is performed using a pressurizing gas introduced from the upstream side of the buffer tank through the buffer tank bypass passage so as to increase a pressurizing speed. Accordingly, a pressurization time can be shortened as a whole.

In the pressurizing system of the present invention, a plurality of the buffer tanks are provided, and the buffer tanks are arranged in parallel with respect to the pressurizing nozzle, and with a pressure in the buffer tank falling to a predetermined value or less due to pressurization performed by one of the buffer tanks, the pressure control means switches the buffer tank to the other buffer tank.

Switching between the buffer tanks allows a pressurizing gas to be supplied to the powder supply hopper from the pressurizing nozzle with a differential pressure higher than a predetermined value. Accordingly, a pressurization time can be shortened.

It is sufficient to set the number of buffer tanks to two or more. Further, setting the number of buffer tanks to three or more allows the number of times of switching the buffer tanks to be increased at the time of pressurizing the powder supply hopper, so that pressurization can be performed while a sufficient differential pressure is ensured. Accordingly, a pressurization time can be shortened.

A gasification facility of the present invention includes: the pressurizing system for a powder supply hopper described in any one of the above-mentioned configurations; a powder supply hopper configured to be pressurized by the pressurizing system; and a gasification furnace configured to gasify a carbon-containing solid fuel which is powder supplied from the powder supply hopper.

A solid carbonaceous fuel in the form of powder is supplied into the gasification furnace from the powder supply hopper which is pressurized by the pressurizing system. The solid carbonaceous fuel is gasified in the gasification furnace.

An integrated gasification combined cycle facility of the present invention includes: the gasification facility described above; a gas turbine configured to be rotationally driven by causing at least a portion of produced gas produced by the gasification facility to be combusted; and a power generator configured to be driven by the gas turbine.

In a method for pressurizing a powder supply hopper of the present invention, the powder supply hopper is pressurized by: a pressurizing nozzle configured to supply a pressurizing gas into the powder supply hopper where powder is accumulated; a filter configured to face a space in the powder supply hopper where the powder is accumulated, and to allow the pressurizing gas to pass through the filter, the filter being provided at an end of the pressurizing nozzle; and a buffer tank in which a pressurizing gas to be supplied to the powder supply hopper is collected at a first predetermined pressure, and the method includes, in starting pressurization of the powder supply hopper, starting supply of a pressurizing gas at a second predetermined pressure which is lower than the first predetermined pressure of a pressurizing gas collected in the buffer tank.

In starting pressurization of the powder supply hopper, a pressurizing gas is supplied at a pressure lower than a pressure in the buffer tank and hence, a differential pressure to be applied to the filter, provided at the end of the pressurizing nozzle, can be reduced. Accordingly, a flow velocity of a pressurizing gas which passes through the filter can be suppressed, thus reducing a stress to be applied to the filter and hence, breakage of the filter can be prevented.

Advantageous Effects of Invention

In starting pressurization of the powder supply hopper, a pressurizing gas is supplied at a pressure lower than a pressure in the buffer tank. Accordingly, in starting pressurization of the powder supply hopper, it is possible to prevent an excessive differential pressure from being applied to the filter of the pressurizing nozzle as much as possible.

DESCRIPTION OF EMBODIMENTS

Hereinafter, embodiments according to the present invention are described with reference to the drawings.

First, an integrated coal gasification combined cycle which is one embodiment of an integrated gasification combined cycle facility of the present invention is described.

Figure 8:
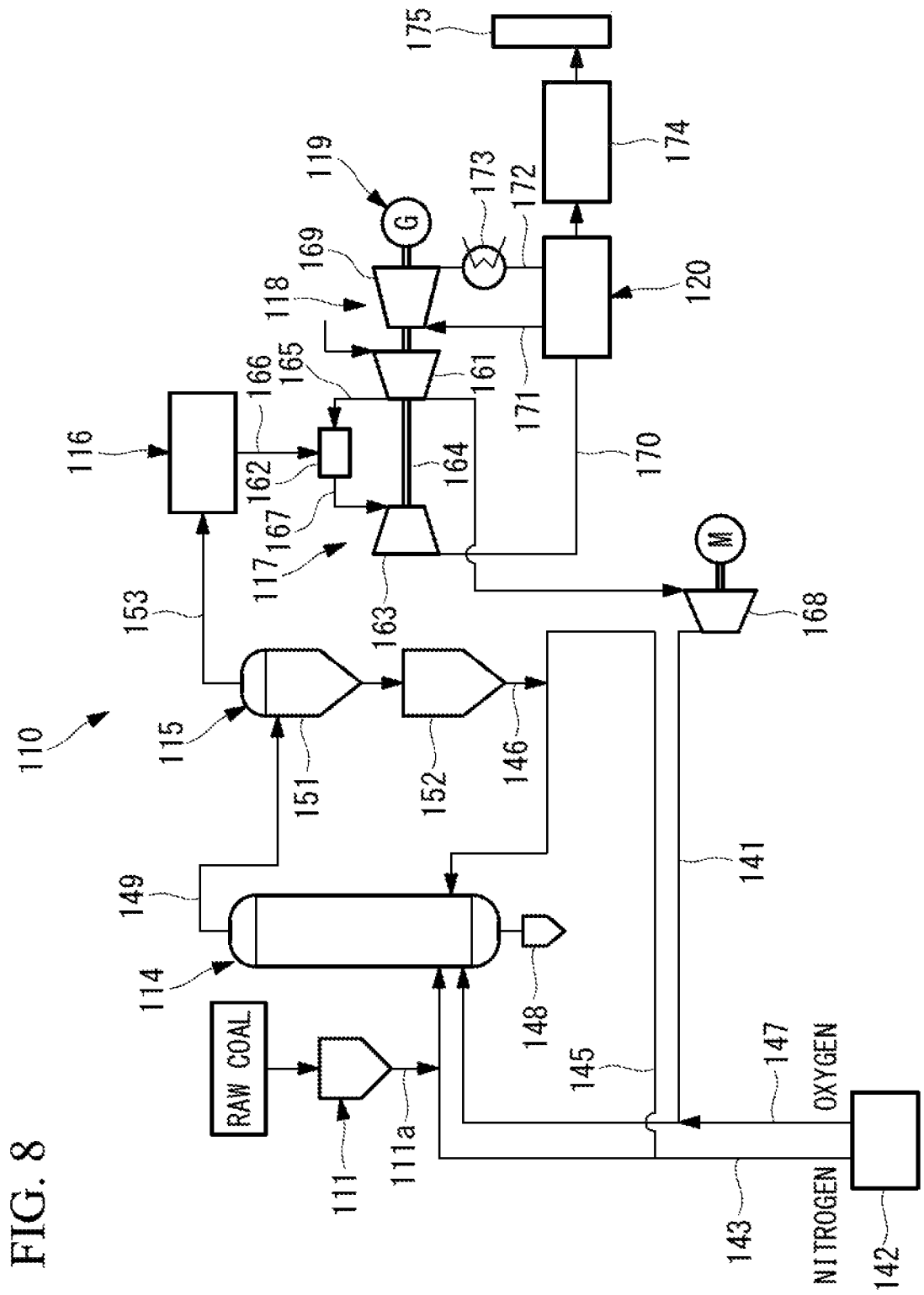
FIG. 8 is a schematic configuration diagram showing an integrated coal gasification combined cycle according to one embodiment of the present invention.
Figure 9:
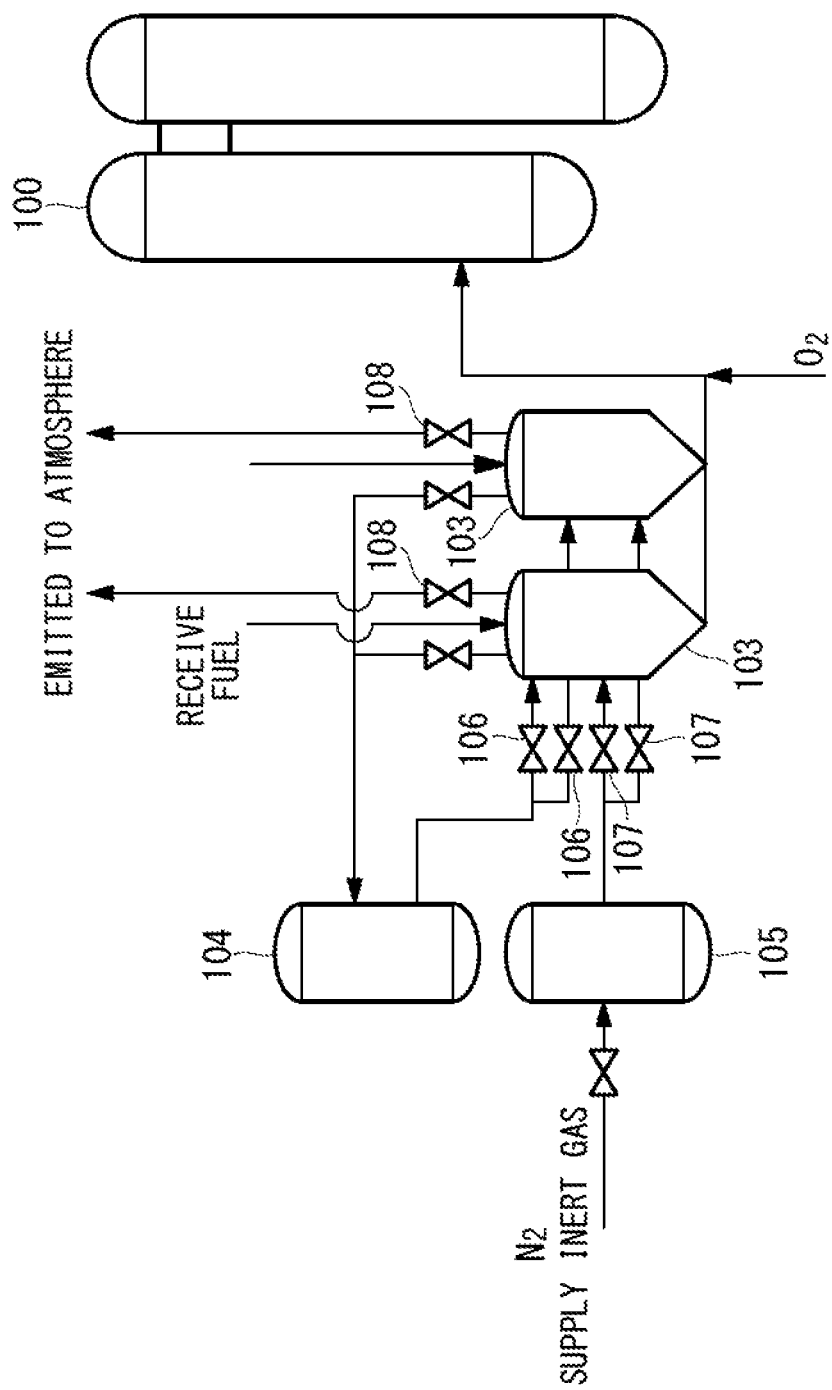
FIG. 9 is a schematic configuration diagram showing a conventional pressurizing system of a pulverized coal supply hopper.

As shown in FIG. 8, an integrated coal gasification combined cycle (IGCC) facility 110 adopts an air combustion system where air is used as an oxidizer, and a produced gas is produced from a fuel in a gasification furnace 114. The integrated coal gasification combined cycle facility 110 generates power in such a manner that a produced gas produced in the gasification furnace 114 is purified by a gas purifying device 116, thus forming a fuel gas and, thereafter, the fuel gas is supplied to a gas turbine facility 117 so as to generate power. That is, the integrated coal gasification combined cycle facility 110 is a power generation facility of an air combustion system (air-blown power generation facility). For a fuel to be supplied to the gasification furnace 114, a carbon-containing solid fuel such as coal is used, for example.

Figure 1:
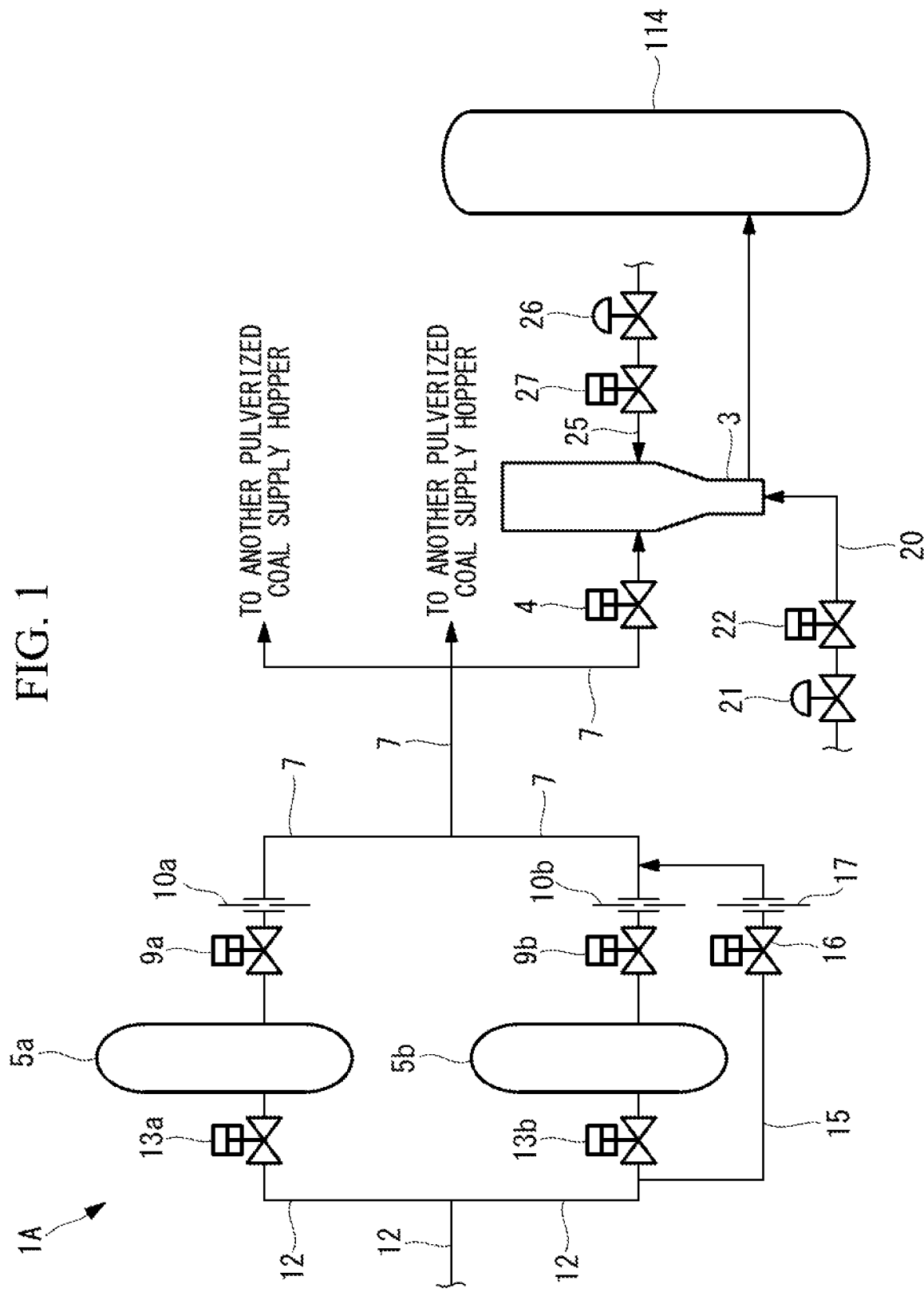
FIG. 1 is a schematic configuration diagram showing a pressurizing system according to a first embodiment of the present invention.

As shown in FIG. 1, the integrated coal gasification combined cycle (integrated gasification combined cycle facility) 110 includes: a coal feeding device 111; the gasification furnace 114; a char recovery device 115; the gas purifying device 116; the gas turbine facility 117; a steam turbine facility 118; a power generator 119; and a heat recovery steam generator (HRSG) 120.

The coal feeding device 111 is supplied with coal which is a carbon-containing solid fuel in the form of raw coal. The coal feeding device 111 pulverizes the coal by a coal mill (not shown in the drawing) or the like, thus manufacturing pulverized coal which is coal pulverized into a fine particle state. The pulverized coal manufactured by the coal feeding device 111 is pressurized by nitrogen gas forming a conveying inert gas which is supplied from an air separation device 142 described later, and the pulverized coal is supplied toward the gasification furnace 114. An inert gas means an inert gas with an oxygen content of approximately 5 volume % or less. Nitrogen gas, carbon dioxide gas, argon gas or the like are representative examples of inert gases. However, the oxygen content is not necessarily limited to approximately 5% or less.

The gasification furnace 114 is supplied with the pulverized coal manufactured by the coal feeding device 111. At the same time, char (unreacted components of coal and ash) which is recovered by the char recovery device 115 is returned and supplied to the gasification furnace 114 in a reusable form.

Further, the gasification furnace 114 is connected with a compressed air supply line 141 extending from the gas turbine facility 117 (compressor 161) and hence, a portion of compressed air which is compressed by the gas turbine facility 117 can be supplied to the gasification furnace 114. The air separation device 142 produces nitrogen and oxygen in a separated manner from air in the atmosphere. A first nitrogen supply line 143 connects the air separation device 142 and the gasification furnace 114 to each other. The first nitrogen supply line 143 is connected with a coal feeding line 111a extending from the coal feeding device 111. A second nitrogen supply line 145 which is branched from the first nitrogen supply line 143 is also connected to the gasification furnace 114, and the second nitrogen supply line 145 is connected with a char return line 146 extending from the char recovery device 115. Further, the air separation device 142 is connected to the compressed air supply line 141 through an oxygen supply line 147. Nitrogen separated by the air separation device 142 flows through the first nitrogen supply line 143 and the second nitrogen supply line 145, so that nitrogen is utilized as a conveying gas for coal or char. Oxygen separated by the air separation device 142 flows through the oxygen supply line 147 and the compressed air supply line 141, so that oxygen is utilized as an oxidizer in the gasification furnace 114.

The gasification furnace 114 includes a gasification furnace of a two-stage entrained bed type, for example. The gasification furnace 114 causes coal (pulverized coal) and char supplied into the gasification furnace 114 to be partially combusted by an oxidizer (air, oxygen) so as to gasify the coal and the char, thus producing a combustible gas. The gasification furnace 114 is provided with a foreign substance removing device 148 which removes a foreign substance (slag) mixed into pulverized coal. The gasification furnace 114 is connected with a gas production line 149, through which a combustible gas is supplied toward the char recovery device 115 and hence, a combustible gas containing char can be discharged. In this case, it may be configured such that a syngas cooler (gas cooler) is provided in the gas production line 149, so that a combustible gas is cooled to a predetermined temperature and, thereafter, may be supplied to the char recovery device 115.

The char recovery device 115 includes a dust collector 151 and a supply hopper 152. In this case, the dust collector 151 is formed of one or a plurality of cyclones or porous filters, and can separate char contained in a combustible gas produced in the gasification furnace 114. The combustible gas, from which the char is separated, is fed to the gas purifying device 116 through a gas discharge line 153. The supply hopper 152 accumulates char which is separated from a combustible gas in the dust collector 151. It may be configured such that a bin is disposed between the dust collector 151 and the supply hopper 152, and a plurality of supply hoppers 152 are connected to the bin. The char return line 146 extending from the supply hopper 152 is connected to the second nitrogen supply line 145.

The gas purifying device 116 removes impurities, such as a sulfur compound and a nitrogen compound, from a combustible gas from which the char is separated by the char recovery device 115, thus performing gas purification. The gas purifying device 116 manufactures a fuel gas by purifying a combustible gas, and supplies the fuel gas to the gas turbine facility 117. A combustible gas, from which the char is separated, still contains a sulfur content (H2S or the like). Accordingly, the gas purifying device 116 removes and recovers the sulfur content using an amine absorption liquid, and effectively utilizes the sulfur content.

The gas turbine facility 117 includes the compressor 161, a combustor 162, and a turbine 163. The compressor 161 and the turbine 163 are coupled to each other by way of a rotary shaft 164. The combustor 162 is connected with a compressed air supply line 165 extending from the compressor 161 and, at the same time, is connected with a fuel gas supply line 166 extending from the gas purifying device 116. The combustor 162 is also connected with a combustion gas supply line 167 extending to the turbine 163. Further, the gas turbine facility 117 is provided with the compressed air supply line 141 which extends from the compressor 161 to the gasification furnace 114. A booster 168 is provided in an intermediate portion of the compressed air supply line 141. Accordingly, in the combustor 162, a portion of compressed air supplied from the compressor 161 and at least a portion of a fuel gas supplied from the gas purifying device 116 are mixed with each other and are combusted, thus generating a combustion gas. The generated combustion gas is supplied toward a turbine. The turbine 163 rotationally drives the rotary shaft 164 using the supplied combustion gas, thus rotationally driving the power generator 119.

The steam turbine facility 118 includes a turbine 169 coupled to the rotary shaft 164 of the gas turbine facility 117. The power generator 119 is coupled to a proximal end portion of the rotary shaft 164. The heat recovery steam generator 120 is connected with an exhaust gas line 170 extending from the gas turbine facility 117 (the turbine 163). The heat recovery steam generator 120 performs heat exchange between supplied water and an exhaust gas thus producing steam. A steam supply line 171 is provided between the heat recovery steam generator 120 and the turbine 169 of the steam turbine facility 118 and, at the same time, a steam recovery line 172 is also provided between the heat recovery steam generator 120 and the turbine 169. The steam recovery line 172 is provided with a condenser 173. Steam which the heat recovery steam generator 120 produces may include steam which is obtained in such a manner that steam is produced by performing heat exchange with a produced gas in the syngas cooler, and the steam is further subjected to heat exchange in the heat recovery steam generator 120. Accordingly, in the steam turbine facility 118, the turbine 169 is rotationally driven by steam supplied from the heat recovery steam generator 120, so that the rotary shaft 164 is rotationally driven, thus rotationally driving the power generator 119.

A gas cleaning device 174 is provided between an outlet of the heat recovery steam generator 120 and a chimney 175.

Next, the manner of operation of the integrated coal gasification combined cycle facility 110 having the above-mentioned configuration is described.

In the integrated coal gasification combined cycle facility 110 of this embodiment, when the coal feeding device 111 is supplied with raw coal (coal), the coal is pulverized into a fine particle state in the coal feeding device 111, thus being formed into pulverized coal. The pulverized coal manufactured by the coal feeding device 111 flows through the first nitrogen supply line 143 using nitrogen supplied from the air separation device 142, and the pulverized coal is supplied to the gasification furnace 114. Char recovered by the char recovery device 115 described later flows through the second nitrogen supply line 145 using nitrogen supplied from the air separation device 142, and the char is also supplied to the gasification furnace 114. Compressed air extracted from the gas turbine facility 117 described later is boosted by the booster 168. Thereafter, the compressed air is also supplied to the gasification furnace 114 through the compressed air supply line 141 together with oxygen supplied from the air separation device 142.

In the gasification furnace 114, pulverized coal and char supplied to the gasification furnace 114 is combusted by compressed air (oxygen), so that the pulverized coal and char are gasified, thus producing a combustible gas (produced gas). The combustible gas is discharged from the gasification furnace 114 through the gas production line 149, and is fed to the char recovery device 115.

In the char recovery device 115, the combustible gas is first supplied to the dust collector 151, so that particulate char contained in the combustible gas is separated. Then, the combustible gas, from which the char is separated, is fed to the gas purifying device 116 through the gas discharge line 153. On the other hand, the particulate char separated from the combustible gas is deposited in the supply hopper 152. The particulate char is returned to the gasification furnace 114 through the char return line 146, and is recycled.

The combustible gas, from which the char is separated by the char recovery device 115, is subjected to gas purification where impurities, such as a sulfur compound and a nitrogen compound, are removed from the combustible gas, thus manufacturing a fuel gas, in the gas purifying device 116. The compressor 161 produces compressed air, and supplies the compressed air to the combustor 162. The combustor 162 mixes together and then combines the compressed air supplied from the compressor 161 and the fuel gas supplied from the gas purifying device 116, thus producing a combustion gas. Rotationally driving the turbine 163 by the combustion gas allows the compressor 161 and the power generator 119 to be rotationally driven by way of the rotary shaft 164. The gas turbine facility 117 can generate power as described above.

The heat recovery steam generator 120 performs heat exchange between an exhaust gas discharged from the turbine 163 of the gas turbine facility 117 and supplied water, thus producing steam. The heat recovery steam generator 120 supplies the produced steam to the steam turbine facility 118. In the steam turbine facility 118, rotationally driving the turbine 169 by the steam supplied from the heat recovery steam generator 120 allows the power generator 119 to be rotationally driven by way of the rotary shaft 164, so that power can be generated.

The gas turbine facility 117 and the steam turbine facility 118 may not rotationally drive one power generator 119 coaxially. It may be configured such that the gas turbine facility 117 and the steam turbine facility 118 have different axes for rotationally driving a plurality of power generators.

Thereafter, in the gas cleaning device 174, harmful substances in an exhaust gas discharged from the heat recovery steam generator 120 are removed, and a cleaned exhaust gas is emitted to the atmosphere through the chimney 175.

First Embodiment

Figure 2:
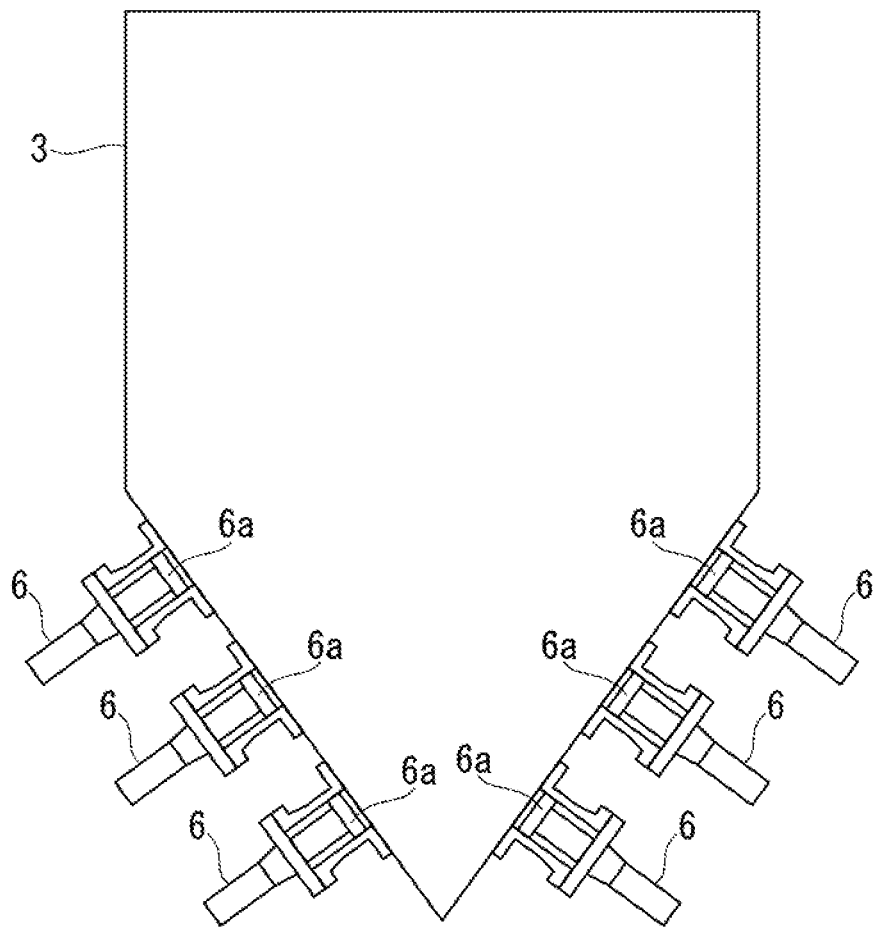
FIG. 2 is a longitudinal cross-sectional view showing a hopper shown in FIG. 1.

Hereinafter, a first embodiment of the present invention is described with reference to FIG. 1 to FIG. 3.

FIG. 1 shows a schematic configuration of a pressurizing system 1A for a pulverized coal supply hopper (powder supply hopper) 3 connected to the downstream side of the coal feeding device 111 of the above-mentioned integrated coal gasification combined cycle facility 110.

In this embodiment, coal is used as a carbon-containing solid fuel, so that pulverized coal is used as a finely powdered fuel (powder), and is supplied to the gasification furnace 114 through fine powder supply hoppers (finely powdered fuel supply hopper, powder supply hopper). The pulverized coal supply hoppers (hereinafter, simply referred to as "hoppers") 3 temporarily accumulate pulverized coal to be supplied to the gasification furnace 114 of the integrated coal gasification combined cycle facility 110.

A plurality of (three in this embodiment) hoppers 3 are provided, and are provided in parallel with respect to the gasification furnace 114. In FIG. 1, only one hopper 3 is shown, and the illustration of the remaining two hoppers is omitted. When pulverized coal is supplied to the gasification furnace 114 from the hopper 3, the gasification furnace 114 gasifies the pulverized coal, thus producing a fuel gas.

The hoppers 3 are connected with nitrogen gas supply headers (pressurizing gas supply pipes) 7 through which a pressurizing gas, such as nitrogen gas, for example, for pressurizing the inside of the hopper 3 is supplied. Each nitrogen gas supply header 7 connected to the hopper 3 is provided with a hopper inlet valve (powder supply hopper inlet valve) 4 on the inlet side of the hopper 3. By opening and closing a hopper inlet valve 4, supply of nitrogen gas (pressurizing gas) to the hopper 3 is controlled. As shown in FIG. 2, the nitrogen gas supply header 7 is provided with pressurizing nozzles 6 at a downstream end thereof. A plurality of pressurizing nozzles 6 are provided at a tapered portion of the hopper 3 which is disposed on a lower side of the hopper 3 in the vertical direction. The respective pressurizing nozzles 6 are branched from the nitrogen gas supply headers 7. An end of each pressurizing nozzle 6 is provided with a filter 6a made of a porous sintered metal, for example. The filter 6a faces a space in the hopper 3 where powder is accumulated. At the same time, the filter 6a allows nitrogen gas supplied from the nitrogen gas supply header 7 to pass therethrough. Providing the filter 6a prevents a backflow of pulverized coal in the hopper 3 to a nitrogen gas system.

As shown in FIG. 1, the hopper 3 is provided with a fluidizing nitrogen pipe 20. Pulverized coal in the hopper 3 is fluidized by a fluidizing gas such as nitrogen gas introduced from the fluidizing nitrogen pipe 20. The fluidizing nitrogen pipe 20 is provided with a flow rate regulating valve 21 and an opening and closing valve 22.

The hopper 3 is provided with a regulating nitrogen pipe (regulating gas supply system) 25. The regulating nitrogen pipe 25 is connected to each pressurizing nozzle 6 shown in FIG. 2, and is used in regulating a fluidization state of pulverized coal in the hopper 3. For example, a regulating gas such as nitrogen gas is supplied so as to avoid a poor fluidization state of pulverized coal preventing continuous supply of pulverized coal during the supply of pulverized coal from the hopper 3 to a coal gasification furnace.

Accordingly, nitrogen gas having a pressure lower than a pressure used in pressurizing the inside of the hopper 3 is supplied. The regulating nitrogen pipe 25 is provided with a flow rate regulating valve 26 and an opening and closing valve 27.

Two buffer tanks of a first buffer tank 5a and a second buffer tank 5b are connected in parallel with respect to the hopper 3 with the nitrogen gas supply headers 7 interposed between the tanks and the hopper 3.

Each of the buffer tanks 5a, 5b is supplied with nitrogen gas introduced from nitrogen gas introduction pipes 12 connected to a nitrogen gas supply source (not shown in the drawing). The nitrogen gas introduction pipe 12 is provided with a first introduction valve 13a on the inlet side of the first buffer tank 5a, and the nitrogen gas introduction pipe 12 is provided with a second introduction valve 13b on the inlet side of the second buffer tank 5b. When nitrogen gas is supplied to the buffer tanks 5a, 5b from the nitrogen gas supply source, the nitrogen gas is collected in the buffer tanks 5a, 5b to a pressure sufficient to pressurize the hoppers 3.

A first buffer tank outlet valve 9a and a first buffer tank orifice 10a are provided on the outlet side of the first buffer tank 5a. In the same manner, a second buffer tank outlet valve 9b and a second buffer tank orifice 10b are provided on the outlet side of the second buffer tank 5b.

Throttle amounts (orifice diameters) of the first buffer tank orifice 10a and the second buffer tank orifice 10b are determined by taking into account a flow rate and a pressure which are allowed in pressurizing the inside of the hopper 3.

An upstream end of a buffer tank bypass pipe (buffer tank bypass passage) 15 is connected to the nitrogen gas introduction pipe 12 on the upstream side of the second introduction valve 13b provided in the nitrogen gas introduction pipe 12. A downstream end of the buffer tank bypass pipe 15 is connected to the nitrogen gas supply header 7 so as to bypass the second introduction valve 13b, the second buffer tank 5b, the second buffer tank outlet valve 9b and the second buffer tank orifice 10b. The buffer tank bypass pipe 15 is provided with a buffer tank bypass opening and closing valve 16 and a buffer tank bypass orifice 17. The buffer tank bypass orifice 17 has a larger throttle amount (orifice diameter) than the first buffer tank orifice 10a and the second buffer tank orifice 10b. To be more specific, a throttle amount of the buffer tank bypass orifice 17 is set to a value which falls within a range of 10 to 30% of a supply hopper operation pressure P2 which is a final pressurization value for the hopper 3 (see FIG. 3).

Although not shown in the drawing, opening and closing operation of the respective valves such as the above-mentioned hopper inlet valve 4 and buffer tank outlet valves 9a, 9b is performed in response to a command from a control unit (pressure control means).

The control unit is formed of a CPU (Central Processing Unit), a RAM (Random Access Memory), a ROM (Read Only Memory), a computer readable storage medium and the like, for example. A series of processing for realizing various functions is stored in the storage medium or the like in the form of a program, for example. The CPU reads the program into the RAM or the like so as to perform information processing and arithmetic processing, thus realizing various functions. The program may adopt any form such as the form where the program is installed in the ROM or another storage medium in advance, the form where the program is provided in a state of being stored in a computer readable storage medium, or the form where the program is distributed through a wired or wireless communication means. The computer readable storage medium includes a magnetic disk, a magneto-optical disc, a CD-ROM, a DVD-ROM, a semiconductor memory or the like.

Next, a method for pressurizing the hopper 3 using the pressurizing system 1A having the above-mentioned configuration is described with reference to FIG. 3. The following operations of the respective valves are performed by the above-mentioned control unit.

A pressure in the hopper 3 before pressurization is performed is an atmospheric pressure since the hopper 3 is in a state after pulverized coal is introduced into the hopper 3 from a pulverized coal bin (not shown in the drawing). After pulverized coal is introduced into the hopper 3, the hopper 3 is hermetically sealed and, then, the hopper 3 is pressurized by nitrogen gas.

Figure 3:
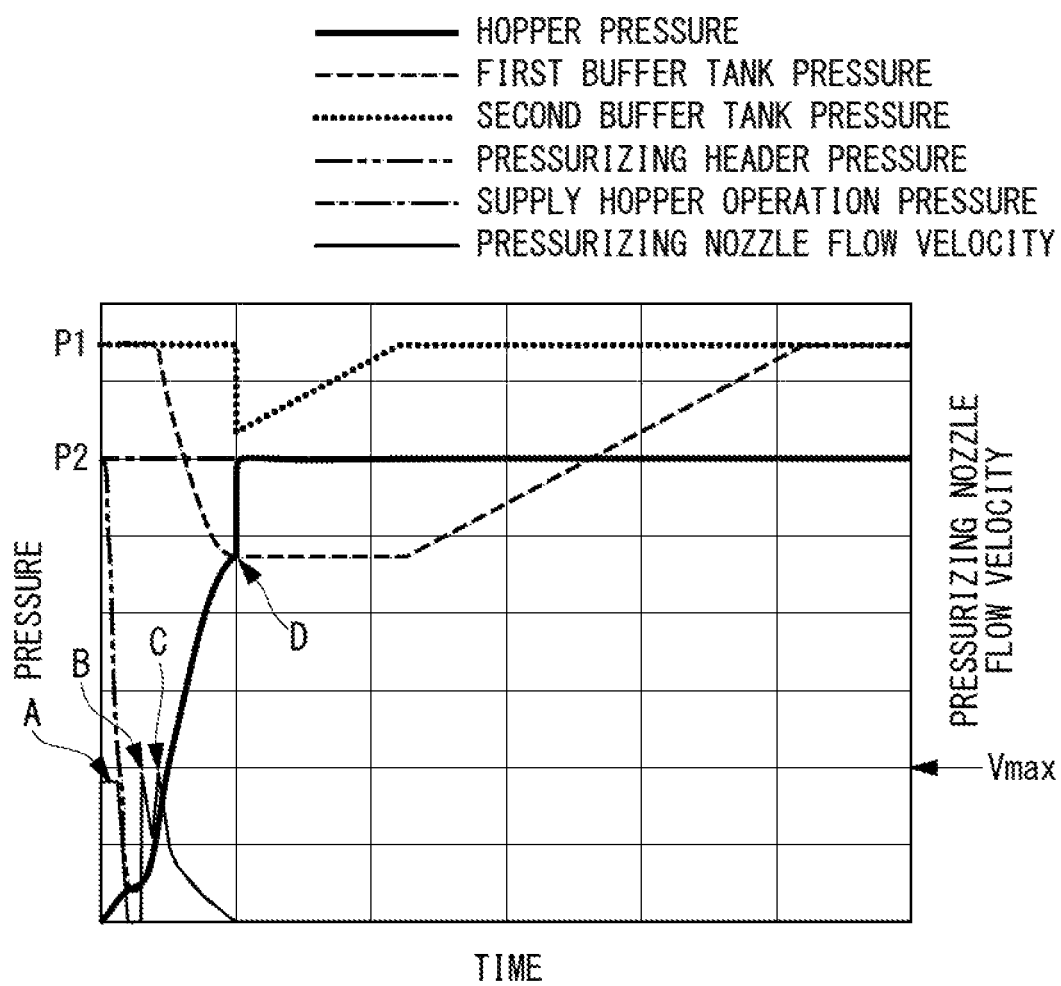
FIG. 3 is a graph showing a pressurizing method according to the first embodiment of the present invention.

Nitrogen gas, supplied from a nitrogen supply source through the nitrogen gas introduction pipes 12, is collected in each of the buffer tanks 5a, 5b at a pressure P1 which is a first predetermined pressure (see FIG. 3). All of the above-mentioned valves such as the respective introduction valves 13a, 13b, the respective buffer tank outlet valves 9a, 9b and the buffer tank bypass opening and closing valve 16 are closed.

The pressure P1 in the buffer tanks 5a, 5b is set to a pressure larger than the supply hopper operation pressure P2 which is used in supplying pulverized coal from the hopper 3 to the gasification furnace 114.

In starting the pressurization of the hopper 3, first, only the hopper inlet valve 4 is opened over a predetermined time period. With such an operation, only nitrogen gas which is left in the nitrogen gas supply header 7 is introduced into the hopper 3. In this initial pressurization period, as shown in FIG. 3, a pressure in the nitrogen gas supply header 7 ("pressurizing header pressure" in FIG. 3) rapidly decreases, while a pressure in the hopper 3 slightly increases. As indicated by reference character A in FIG. 3, a flow velocity of nitrogen gas at the pressurizing nozzle 6 at this point of time is lower than a maximum flow velocity Vmax (see right axis in FIG. 3) at which the filter 6a (see FIG. 2) may be damaged.

After the hopper inlet valve 4 is fully opened, the buffer tank bypass opening and closing valve 16 is opened while the degree of opening of the hopper inlet valve 4 is maintained. A throttle amount (orifice diameter) of the buffer tank bypass orifice 17 is set such that a gas flows at a predetermined flow rate and pressure. Accordingly, the inside of the hopper 3 is pressurized to a predetermined pressure which is a second predetermined pressure in the initial pressurization period. During such pressurization of the hopper 3, as indicated by reference character B in FIG. 3, a flow velocity of nitrogen gas at the pressurizing nozzles 6 assumes a maximum value at the timing when the buffer tank bypass opening and closing valve 16 is opened. However, the maximum value is less than the maximum flow velocity Vmax. As described above, a throttle amount of the buffer tank bypass orifice 17 in the initial pressurization period of the hopper 3 is set to a value which falls within a range of 10 to 30% of the supply hopper operation pressure P2 which is the final pressurization value for the hopper 3. Accordingly, a flow velocity at the pressurizing nozzle assumes a value less than the maximum flow velocity Vmax. A throttle amount of the buffer tank bypass orifice 17 is determined such that the flow velocity does not exceed the maximum flow velocity Vmax.

Then, after the buffer tank bypass opening and closing valve 16 is closed, the first buffer tank outlet valve 9a is opened. With such operations, a pressure in the hopper 3 increases and, at the same time, a pressure in the first buffer tank 5a decreases. Immediately after the first buffer tank outlet valve 9a is opened, a flow velocity at the pressurizing nozzle is less than the maximum flow velocity Vmax as indicated by reference character C in FIG. 3. The reason is as follows. Although a pressure of nitrogen gas held in the first buffer tank 5a is higher than a pressure value (second predetermined pressure) in the initial pressurization period, the inside of the hopper 3 is already subjected to the initial pressurization to a predetermined pressure which is the second predetermined pressure. Accordingly, a differential pressure between the upstream side and the downstream side of the pressurizing nozzle can be suppressed.

When a pressure in the first buffer tank 5a and a pressure in the hopper 3 approximate each other, a flow velocity at the pressurizing nozzle decreases. Accordingly, at the timing, indicated by reference character D in FIG. 3, when a differential pressure between the first buffer tank 5a and the hopper 3 or a pressure in the first buffer tank 5a assumes a predetermined value, the first buffer tank outlet valve 9a is closed and, at the same time, the second buffer tank outlet valve 9b is opened. With such operations, nitrogen gas is further supplied from the second buffer tank 5b to the hopper 3, so that the hopper 3 is pressurized to the supply hopper operation pressure P2.

After the above-mentioned pressurizing step is completed, the hopper inlet valve 4 and the second buffer tank outlet valve 9b are closed. Further, the respective introduction valves 13a, 13b are opened so as to pressurize the buffer tanks 5a, 5b to a predetermined pressure P1. These operations are performed so as to prepare for the next pressurizing step.

Figure 4:
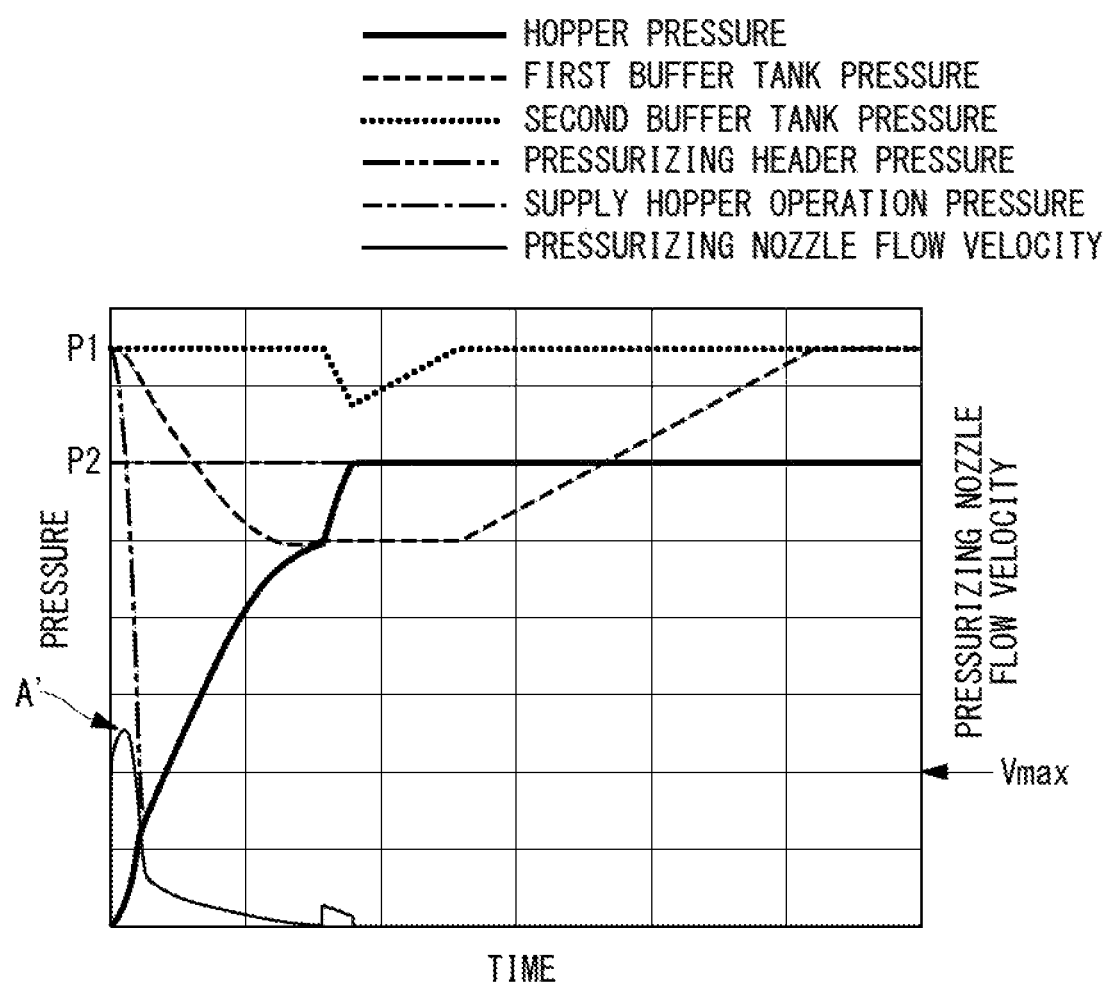
FIG. 4 is a graph showing a pressurizing method, which is different from the pressurizing method of the first embodiment, as a comparative example.

FIG. 4 shows a pressurizing method in the initial pressurization period of the hopper 3 as a comparative example where, different from this embodiment, neither the buffer tank bypass pipe 15 nor the buffer tank bypass opening and closing valve 16 is used.

In the comparative example, at the time of starting pressurization, the first buffer tank outlet valve 9a is opened and, thereafter, the hopper inlet valve 4 is opened. With such operations, a differential pressure between an atmospheric pressure in the hopper 3 and the pressure P1 in the first buffer tank 5a is applied to the pressurizing nozzles 6. Further, nitrogen gas which is left in the nitrogen gas supply header 7 is also introduced into the pressurizing nozzles 6. Accordingly, a flow velocity at the pressurizing nozzle exceeds a maximum flow velocity Vmax (see reference character A' in FIG. 4).

Different from this embodiment, the comparative example does not adopt initial pressurization which uses the buffer tank bypass opening and closing valve 16. However, the point where the hopper 3 is pressurized to the supply hopper operation pressure P2 using the second buffer tank 5b is similar to this embodiment.

As described above, according to this embodiment, the following operation and advantageous effects can be acquired.

In starting the pressurization of the hopper 3, in the initial pressurization period of the hopper 3, only the hopper inlet valve 4 is opened over a predetermined time period so as to supply nitrogen gas remaining in the nitrogen gas supply header 7 first to the hopper, so that the hopper 3 is pressurized to a predetermined pressure which is the second predetermined pressure. Accordingly, the hopper 3 can be pressurized at a pressure lower than the pressure P1 which is the first predetermined pressure in the buffer tanks 5a, 5b. Further, a throttle of the buffer tank bypass orifice 17 regulates a flow velocity of a pressurizing gas which passes through the filter 6a such that the flow velocity does not exceed the maximum flow velocity Vmax. Accordingly, different from the comparative example, it is possible to avoid the pressure P1 in the buffer tanks 5a, 5b being applied to the pressurizing nozzles 6 from the initial stage of the pressurization. Therefore, in the initial pressurization period of the hopper 3, a differential pressure to be applied to the filter 6a provided at the end of the pressurizing nozzle 6 can be reduced. As a result, a flow velocity of a pressurizing gas which passes through the filter 6a can be suppressed, thus reducing a stress applied to the filter 6a and hence, breakage of the filter 6a can be prevented.

In the initial pressurization period of the hopper 3, the buffer tank bypass opening and closing valve 16 is opened so as to perform pressurization for initial pressurization of the hopper 3 using nitrogen gas introduced from the upstream side of the buffer tanks 5a, 5b. By performing the initial pressurization as described above, pressurizing speed for the hopper 3 can be increased while a flow velocity at the pressurizing nozzle is appropriately set within a range which does not exceed the maximum flow velocity Vmax. Accordingly, initial pressurization can be completed as fast as possible, thus shortening a total pressurization time.

Second Embodiment

Figure 5:
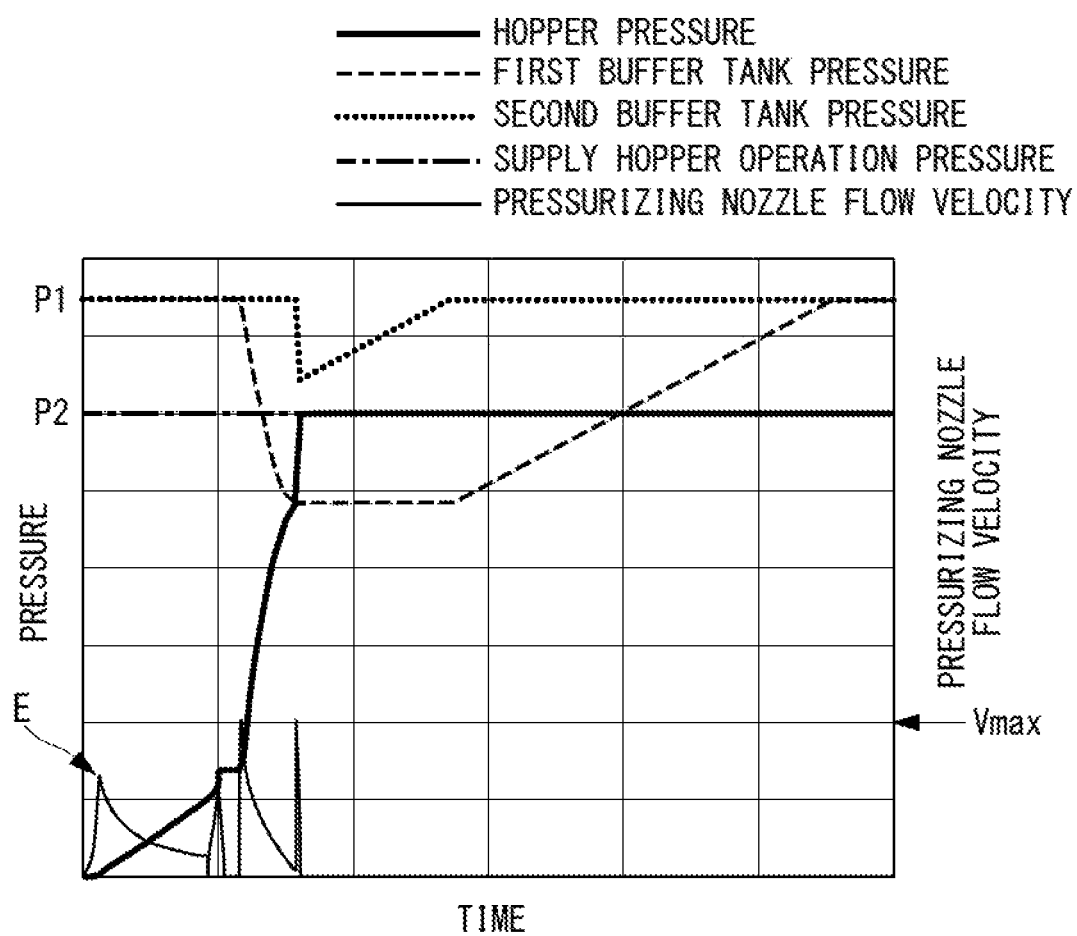
FIG. 5 is a graph showing a pressurizing method according to a second embodiment of the present invention.

Next, a second embodiment of the present invention is described with reference to FIG. 5.

The device configuration in this embodiment is substantially equal to that in the first embodiment. Accordingly, the device configuration in this embodiment are substantially equal to that shown in FIG. 1 and FIG. 2. However, this embodiment differs from the first embodiment in a pressurizing method in the initial pressurization period of the hopper 3. Accordingly, a point which makes this embodiment different from the first embodiment is described.

Pressurization using a pressurizing system 1A is performed as follows.

At the time of starting pressurization, first, initial pressurization which uses a regulating nitrogen pipe 25 (see FIG. 1) is performed. To be more specific, an opening and closing valve 27 is opened and, thereafter, a flow rate regulating valve 26 is gradually opened so as to fully open the flow rate regulating valve 26. Nitrogen having a pressure lower than a pressure P1 in buffer tanks 5a, 5b flows through the regulating nitrogen pipe 25. Accordingly, the regulating nitrogen pipe 25 is preferably used in performing initial pressurization in the hopper 3 to a predetermined pressure which is a second predetermined pressure. Therefore, as indicated by reference character E in FIG. 5, a flow velocity at the pressurizing nozzle assumes a value less than a maximum flow velocity Vmax. A target value of the initial pressurization is set to a value which falls within a range of 10 to 30% of a supply hopper operation pressure P2 which is a final pressurization value for the hopper 3.

After the initial pressurization performed by the regulating nitrogen pipe 25 is finished, the opening and closing valve 27 is closed. Then, a hopper inlet valve 4 is opened so as to supply nitrogen gas which is left in a nitrogen gas supply header 7 into the hopper 3.

A pressure value of the nitrogen gas which is left in the nitrogen gas supply header 7 is higher than a pressure value obtained by the regulating nitrogen pipe 25. However, the inside of the hopper 3 is already subjected to the initial pressurization to a predetermined pressure which is the second predetermined pressure. Accordingly, a differential pressure between the upstream side and the downstream side of the pressurizing nozzle can be suppressed. Therefore, a flow velocity at the pressurizing nozzle assumes a value less than the maximum flow velocity Vmax.

Then, by opening the first buffer tank outlet valve 9a, pressurization is performed by the first buffer tank 5a until the inside of the first buffer tank assumes a pressure of a predetermined value. Next, a second buffer tank outlet valve 9b is opened so as to perform pressurization by the second buffer tank 5b, thus pressurizing the hopper 3 to the supply hopper operation pressure P2. These steps are similar to those in the first embodiment.

As described above, in this embodiment, the regulating nitrogen pipe 25 for regulating a fluidization state of powder in the inside of the hopper 3 is also used in performing the initial pressurization of the hopper 3. Accordingly, it is possible to acquire the advantageous effects that it is unnecessary to additionally provide a pipe, an opening and closing valve and the like for the initial pressurization.

Third Embodiment

Next, a third embodiment of the present invention is described with reference to FIG. 6 and FIG. 7.

A pressurizing system 1B of this embodiment differs from the first embodiment in a point that some configurations are added to the configuration of the first embodiment shown in FIG. 1. Accordingly, in the description made hereinafter, a point which makes this embodiment different from the first embodiment is described. The identical configurations are given the same reference characters, and the repeated description is omitted.

Figure 6:
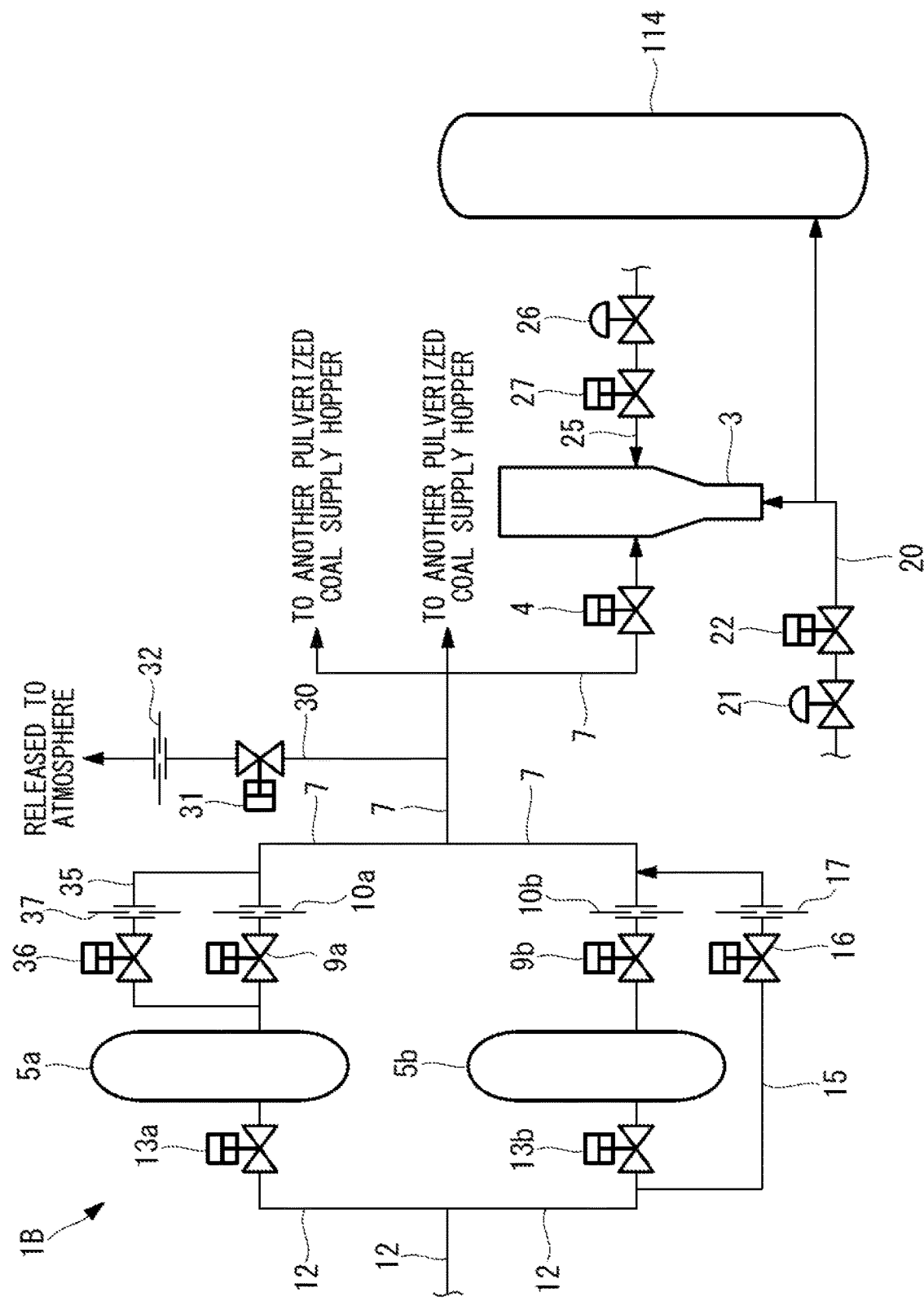
FIG. 6 is a schematic configuration diagram showing a pressurizing system according to a third embodiment of the present invention.
Figure 7:
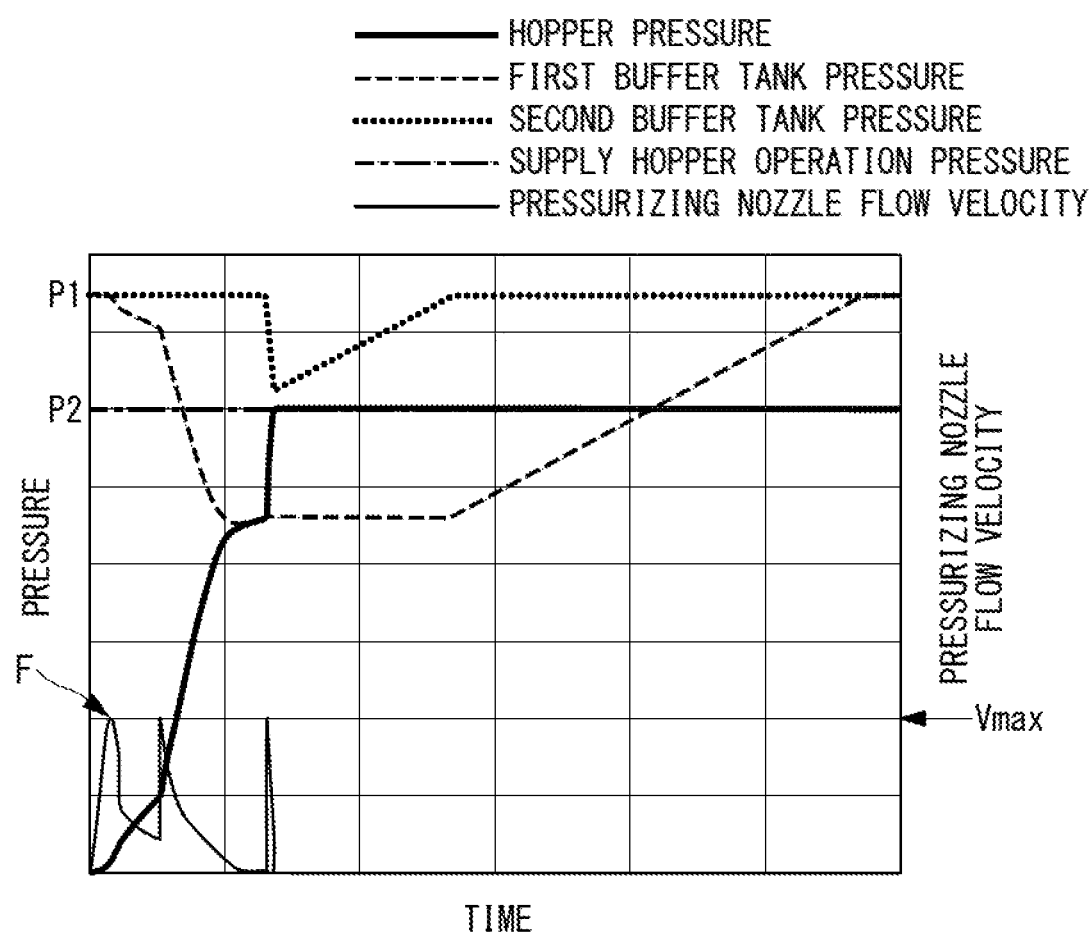
FIG. 7 is a graph showing a pressurizing method according to the third embodiment of the present invention.

As shown in FIG. 6, a gas ventilation pipe 30 is connected to a nitrogen gas supply header 7. The gas ventilation pipe 30 is provided with a gas ventilation opening and closing valve 31 and a gas ventilation orifice 32. The downstream side of the gas ventilation pipe 30 is released to the atmosphere through a bag filter not shown in the drawing, for example. A throttle amount (orifice diameter) of the gas ventilation orifice 32 is set such that a gas is restricted within a flow velocity range which a filter, such as a bag filter, allows to pass therethrough.

A buffer tank outlet valve bypass pipe (buffer tank outlet valve bypass passage) 35 is provided on the outlet side of the first buffer tank 5a, and the buffer tank outlet valve bypass pipe 35 bypasses a first buffer tank outlet valve 9a and a first buffer tank orifice 10a. The buffer tank outlet valve bypass pipe 35 is provided with a bypass opening and closing valve 36 and a bypass orifice 37. A throttle amount of the bypass orifice 37 is set larger than a throttle amount of the first buffer tank orifice 10a. To be more specific, the throttle amount of the bypass orifice 37 is set to a value which falls within a range of 10 to 30% of a supply hopper operation pressure P2 which is a final pressurization value for a hopper 3 (see FIG. 7).

An opening and closing control of the gas ventilation opening and closing valve 31 and the bypass opening and closing valve 36 is performed by the above-mentioned control unit.

Next, a method for pressurizing the hopper 3 using the pressurizing system 1B having the above-mentioned configuration is described with reference to FIG. 6.

In the same manner as the above-mentioned embodiments, before pressurization is started, all of the above-mentioned valves such as introduction valves 13a, 13b, the buffer tank outlet valve 9a, a buffer tank outlet valves 9b, and a buffer tank bypass opening and closing valve 16 are closed.

In starting the pressurization, first, the gas ventilation opening and closing valve 31 is opened, so that only nitrogen gas which is left in the nitrogen gas supply header 7 is released to the atmosphere through the gas ventilation pipe 30.

Thereafter, the gas ventilation opening and closing valve 31 is closed, and a hopper inlet valve 4 is opened and, then, the bypass opening and closing valve 36 provided in the buffer tank outlet valve bypass pipe 35 is opened. With such operations, the initial pressurization is performed such that nitrogen gas is introduced into the hopper 3 from the first buffer tank 5a while a flow rate is restricted by the bypass orifice 37. Accordingly, the inside of the hopper 3 is subjected to the initial pressurization to a predetermined pressure which is a second predetermined pressure. In performing the initial pressurization, a throttle amount of the bypass orifice 37 is set such that the flow rate does not exceed the maximum flow velocity Vmax (see reference character F in FIG. 7).

Then, the bypass opening and closing valve 36 is closed and, thereafter, the first buffer tank outlet valve 9a is opened until a pressure in the first buffer tank assumes a predetermined value. Next, the second buffer tank outlet valve 9b is opened so as to pressurize the hopper 3 to the supply hopper operation pressure P2. These steps are similar to those in the first embodiment.

A pressure value of nitrogen gas at the first buffer tank outlet valve 9a is higher than a pressure value at the bypass opening and closing valve 36 provided in the buffer tank outlet valve bypass pipe 35. However, the inside of the hopper 3 is already subjected to the initial pressurization to a predetermined pressure which is the second predetermined pressure. Accordingly, a differential pressure between the upstream side and the downstream side of the pressurizing nozzle can be suppressed. Therefore, a flow velocity at the pressurizing nozzle assumes a value less than the maximum flow velocity Vmax.

According to this embodiment, the following operation and advantageous effects can be acquired.

Venting a gas in the nitrogen gas supply header 7 through the gas ventilation pipe 30 prevents a residual pressure in the nitrogen gas supply header 7 from being applied to a pressurizing nozzle 6 at the time of starting pressurization. Accordingly, a flow velocity at a filter 6a in an initial stage can be reduced at the time of starting supply of a pressurizing gas.

The initial pressurization is performed using the buffer tank outlet valve bypass pipe 35 provided with the bypass orifice 37 having a throttle amount larger than a throttle amount for nitrogen gas which passes through the first buffer tank outlet valve 9a. Accordingly, nitrogen gas can be supplied to the pressurizing nozzle 6 at a lower pressure compared with the case where supply of a pressurizing gas is started from the first buffer tank outlet valve 9a.

In the above-mentioned embodiments, the IGCC including the coal gasification furnace which produces a combustible gas from pulverized coal has been described as one example. However, the gasification facility of the present invention is also applicable to a gasification facility which gasifies other carbon-containing solid fuel including a biomass fuel such as thinnings, woody waste, driftwood, grasses, wastes, sludge or tires, for example. Further, the gasification facility of the present invention is not limited to a power generation application, and is also applicable to a chemical plant gasification furnace which can acquire a desired chemical substance.

The description has been made with respect to the configuration having the two buffer tanks 5a, 5b are provided. However, three or more buffer tanks may be provided. With such a configuration, in pressurizing the hopper 3, the hopper 3 can be pressurized while a sufficient differential pressure is ensured by increasing the number of times of switching the buffer tanks. Accordingly, a pressurization time can be shortened.

The description has been made by taking the orifice as a means for regulating the throttle amount. However, a flow rate regulating valve may be used instead of the orifice.

REFERENCE SIGNS LIST 1A, 1B pressurizing system
3 pulverized coal supply hopper (powder supply hopper)
4 hopper inlet valve (powder supply hopper inlet valve)
5a first buffer tank
5b second buffer tank
7 nitrogen gas supply header (gas supply pipe)
9a first buffer tank outlet valve
9b second buffer tank outlet valve
10a first buffer tank orifice
10b second buffer tank orifice
12 nitrogen gas introduction pipe
13a first introduction valve
13b second introduction valve
15 buffer tank bypass pipe (buffer tank bypass passage)
16 buffer tank bypass opening and closing valve
17 buffer tank bypass orifice
20 fluidizing nitrogen pipe
21 flow rate regulating valve
22 opening and closing valve
25 regulating nitrogen pipe (regulating gas supply system)
26 flow rate regulating valve
27 opening and closing valve
30 gas ventilation pipe
31 gas ventilation opening and closing valve
32 gas ventilation orifice
35 buffer tank outlet valve bypass pipe (buffer tank outlet valve bypass passage)
36 bypass opening and closing valve
37 bypass orifice
110 integrated coal gasification combined cycle (integrated gasification combined cycle facility)
114 gasification furnace

The invention claimed is:

1. A pressurizing system for a powder supply hopper, the pressurizing system comprising:
a pressurizing nozzle configured to supply a pressurizing gas into a powder supply hopper where powder is accumulated;
a filter configured to face a space in the powder supply hopper where the powder is accumulated, and to allow the pressurizing gas to pass through the filter, the filter being provided at an end of the pressurizing nozzle;
a buffer tank in which a pressurizing gas to be supplied to the powder supply hopper is collected at a first predetermined pressure; and
a pressure control means configured to start, at a time of starting pressurization of the powder supply hopper, supply of a pressurizing gas at a second predetermined pressure which is lower than the first predetermined pressure of the pressurizing gas collected in the buffer tank.

2. The pressurizing system for a powder supply hopper according to claim 1, further comprising:
a gas supply pipe configured to connect the pressurizing nozzle and the buffer tank to each other;
a powder supply hopper inlet valve provided in the gas supply pipe on an upstream side of the pressurizing nozzle; and
a buffer tank outlet valve provided in the gas supply pipe on an outlet side of the buffer tank, wherein
in a state where the buffer tank outlet valve is closed, the pressure control means opens the powder supply hopper inlet valve so as to start supply of a pressurizing gas, thus boosting a pressure of the pressurizing gas to the second predetermined pressure.

3. The pressurizing system for a powder supply hopper according to claim 1, further comprising:
a gas supply pipe configured to connect the pressurizing nozzle and the buffer tank to each other;
a powder supply hopper inlet valve provided in the gas supply pipe on an upstream side of the pressurizing nozzle;
a buffer tank outlet valve provided in the gas supply pipe on an outlet side of the buffer tank; and
a gas ventilation pipe configured to vent a gas in the gas supply pipe, the gas ventilation pipe being connected to the gas supply pipe between the powder supply hopper inlet valve and the buffer tank outlet valve, wherein
in a state where the powder supply hopper inlet valve and the buffer tank outlet valve are closed, the pressure control means starts supply of a pressurizing gas after a gas in the gas supply pipe is vented through the gas ventilation pipe, thus boosting a pressure of the pressurizing gas to the second predetermined pressure.

4. The pressurizing system for a powder supply hopper according to claim 1, further comprising:
a gas supply pipe configured to connect the pressurizing nozzle and the buffer tank to each other;
a powder supply hopper inlet valve provided in the gas supply pipe on an upstream side of the pressurizing nozzle;
a buffer tank outlet valve provided in the gas supply pipe on an outlet side of the buffer tank; and
a buffer tank outlet valve bypass passage configured to bypass the buffer tank outlet valve, wherein
the pressure control means starts supply of a pressurizing gas using the buffer tank outlet valve bypass passage where an amount of pressure reduction of a pressurizing gas is set larger than an amount of pressure reduction of a pressurizing gas which passes through the buffer tank outlet valve.

5. The pressurizing system for a powder supply hopper according to claim 1, further comprising:
a gas supply pipe configured to connect the pressurizing nozzle and the buffer tank to each other;
a powder supply hopper inlet valve provided in the gas supply pipe on an upstream side of the pressurizing nozzle;
a buffer tank outlet valve provided in the gas supply pipe on an outlet side of the buffer tank; and
a regulating gas supply system configured to supply a pressurizing gas, which regulates a pressure in the powder supply hopper, at a pressure lower than the first predetermined pressure of a pressurizing gas collected in the buffer tank, wherein
the pressure control means starts supply of a pressurizing gas using the regulating gas supply system, thus boosting a pressure of the pressurizing gas to the second predetermined pressure.

6. The pressurizing system for a powder supply hopper according to claim 2, further comprising a buffer tank bypass passage configured to supply a pressurizing gas to the gas supply pipe while bypassing the buffer tank from a pressurize gas supply source which supplies a pressurizing gas to the buffer tank, wherein
the pressure control means starts supply of a pressurizing gas using the buffer tank bypass passage.

7. The pressurizing system for a powder supply hopper according to claim 1, wherein
a plurality of the buffer tanks are provided, and the buffer tanks are arranged in parallel with respect to the pressurizing nozzle, and
with a pressure in the buffer tank falling to a predetermined value or less due to pressurization performed by one of the buffer tanks, the pressure control means switches the buffer tank to the other buffer tank.

8. A gasification facility comprising:
the pressurizing system for a powder supply hopper according to claim 1;
a powder supply hopper configured to be pressurized by the pressurizing system; and
a gasification furnace configured to gasify a carbon-containing solid fuel which is powder supplied from the powder supply hopper.

9. An integrated gasification combined cycle facility comprising:
the gasification facility according to claim 8;
a gas turbine configured to be rotationally driven by causing at least a portion of produced gas produced by the gasification facility to be combusted; and
a power generator configured to be driven by the gas turbine.

10. A method for pressurizing a powder supply hopper by:
a pressurizing nozzle configured to supply a pressurizing gas into the powder supply hopper where powder is accumulated;
a filter configured to face a space in the powder supply hopper where the powder is accumulated, and to allow the pressurizing gas to pass through the filter, the filter being provided at an end of the pressurizing nozzle; and
a buffer tank in which a pressurizing gas to be supplied to the powder supply hopper is collected at a first predetermined pressure, the method comprising:
in starting pressurization of the powder supply hopper, starting supply of a pressurizing gas at a second predetermined pressure which is lower than the first predetermined pressure of a pressurizing gas collected in the buffer tank.

* * * * *